United States Patent [19]
Hong

[11] 4,182,808
[45] Jan. 8, 1980

[54] INVERSION POLYMERIZATION PROCESS FOR PRODUCING VINYL RESINS USING A DUAL LAYER COATING

[75] Inventor: Paul O. Hong, Avon Lake, Ohio

[73] Assignee: The B. F. Goodrich Company, Akron, Ohio

[21] Appl. No.: 936,656

[22] Filed: Aug. 25, 1978

[51] Int. Cl.[2] .......................... C08F 2/18; C08F 2/32; C08F 14/06

[52] U.S. Cl. .................................... 526/62; 526/344.2

[58] Field of Search .......................................... 526/62

[56] References Cited

U.S. PATENT DOCUMENTS

| | | | |
|---|---|---|---|
| 3,706,722 | 12/1972 | Nelson et al. | 260/85.5 ZA |
| 4,080,173 | 3/1978 | Cohen | 23/285 |
| 4,117,215 | 9/1978 | Witenhafer et al. | 526/62 |

*Primary Examiner*—Stanford M. Levin
*Attorney, Agent, or Firm*—Roy P. Wymbs

[57] ABSTRACT

This invention relates to a process of producing vinyl polymers or resins by an inversion polymerization technique in the presence of a dual layer coating on the internal surfaces of the polymerization reactor. By inversion polymerization is meant conducting the polymerization reaction in two stages, in the first or initial stage of which the monomer or monomers being polymerized constitute the continuous phase, and in the second or latter stage of polymerization, water constitutes the continuous phase due to the addition of sufficient water to the reactor to form said phase. The dual layer coating comprises an undercoating or primary coating of (1) the self-condensation product of a polyhydric phenol, or (2) the condensation product of two or more polyhydric phenols, or (3) the self-condensation product of a polyhydric naphthol, said coating being applied from an aqueous alkali metal hydroxide solution thereof, and a top coating comprised of a water-soluble suspending agent, such as an alkyl or an alkyl hydroxyalkyl cellulose ether, said top coating being applied from an aqueous solution thereof. By means of the present invention, polymer buildup on the internal surfaces of the reactor is substantially reduced.

17 Claims, No Drawings

INVERSION POLYMERIZATION PROCESS FOR PRODUCING VINYL RESINS USING A DUAL LAYER COATING

BACKGROUND OF THE INVENTION

In British Pat. No. 748,727 there is described an inversion polymerization process which comprises forming an initial conversion of monomer to polymer of up to 20% by mass polymerization of the monomer in the presence of a suitable catalyst. In this portion of the polymerization, the monomer is the continuous phase. Thereafter, sufficient water is added to the polymerization system to cause a phase inversion wherein the water becomes the continuous phase forming a dispersion of the unpolymerized monomer in the water. This dispersion is then polymerized to convert essentially all of the remaining monomer to solid polymer. However, the disadvantage of such a process is that polymer buildup on the internal surfaces of the reactor or "poly" is excessive and requires radical means of cleaning said surfaces after each batch or run is made, such as a high pressure stream of water, solvent cleaning, various hydraulic and mechanical reactor cleaners, and the like, and none of these has proved to be the ultimate in polymer buildup removal. Further, after several runs are made, it has often been necessary to open the reactor and manually scrape the polymer buildup off the internal surfaces. An operation such as this is not only costly, both in labor and down-time of the reactor, but presents potential health hazards as well.

In U.S. Pat. No. 3,706,722 there is described an inversion polymerization process for producing polymers having improved uniformity in porosity, size and structure. This the patentees accomplished by incorporating a nonionic, monomer-soluble surface active agent in the initial continuous monomer phase. While producing a more porous polymer, the polymer buildup is still a problem and detracts from the use of said process on a commercial basis. This is particularly true when producing polymers and copolymers of vinyl chloride where the buildup problem and health hazard is more acute than with many other monomers.

Accordingly, there is a great need to produce polymers having uniform porosity, size and structure by the inversion polymerization procedure, which procedure would substantially eliminate polymer buildup.

SUMMARY OF THE INVENTION

It has been found that if the inversion polymerization process is run in a reactor having the proper coating on the inner surfaces thereof, polymer buildup on said surfaces is substantially eliminated. Further, the uniform porosity, size and structure of the polymer particles are not affected by the presence of said coating. In accordance with the present invention, the inner surfaces of the reactor are coated with a prime coating of (1) the self-condensation product of a polyhydric phenol, or (2) the condensation product of two or more polyhydric phenols, or (3) the self-condensation product of a polyhydric naphthol, and then a top coating is applied over the prime coating, said top coating being comprised of a water-soluble suspending agent, such as an alkyl or alkyl hydroxyalkyl cellulose ether. The top coating is removed or dissolved off the prime coating, and any polymer buildup thereon is removed along with it, when, in the second stage of the polymerization reaction, water is the continuous phase.

DETAILED DESCRIPTION

In preparing the polymers and copolymers by the inversion polymerization process of the instant invention, the first stage or step comprises forming an initial continuous phase of monomer or monomers, which phase contains essentially all of the monomer or monomers to be polymerized. The monomer phase is then polymerized to a conversion of monomer(s) to polymer or copolymer of between about 1.0% and about 20.0% and preferably between about 5.0% and about 12.0%. In this first step or stage the monomer or monomers are polymerized in mass using between about 0.1 and about 0.5% by weight, based on the weight of the monomer(s), of a monomer-soluble polymerization catalyst or initiator. Particularly useful monomer-soluble polymerization initiators are isopropyl peroxypercarbonate and lauroyl peroxide. Also, a water-in-monomer dispersion may be employed in the first stage with the monomer(s) still being the continuous phase. When using the water-in-monomer dispersion, about 0.1% by weight, based on the weight of the water, of a water-soluble suspending agent is employed and the monomer is uniformly mixed with at least about 0.01% by weight, and preferably between about 0.1% and about 1.0% by weight, based on the weight of the monomer(s), of a monomer-soluble dispersing agent.

In the second stage of the inversion polymerization process of the present invention, the water containing a suitable water-soluble suspending or dispersing agent is added to the water-in-monomer dispersion, or to the initially or partially mass polymerized monomer(s). The water solution can be added in any suitable manner. The water solution is added in such an amount so as to give the desired concentration of monomer(s) for final polymerization purposes. In this final polymerization stage, water constitutes the continuous phase.

The monomer-soluble dispersing agents, for use in the present inversion polymerization process, are the nonionic monomer-soluble esters of fatty acids with glycerol, sorbitol and their polyoxyethylene derivatives and the nonionic, monomer-soluble, multi-valent metal salts of fatty acids, alkyl sulfonates and sulfates. As examples of such dispersing agents there may be named sorbitan monostearate, sorbitan tristearate, glycerol monooleate, glycerol monostearate, glycerol monopalmitate, sorbitan monooleate, and the like, calcium dilauryl sulfate, zinc dilauryl sulfate, barium distearyl sulfonate, aluminum trilauryl sulfate, and the like.

As examples of the water-soluble suspending agents are the water-soluble alkyl or hydroxyalkyl alkyl cellulose ethers wherein the alkyl group contains from 1 to 2 carbon atoms and the hydroxyalkyl groups contain from 2 to 4 carbon atoms. Any viscosity grade of the cellulose ethers may be used but it is preferred to use the lower viscosity grades, such as those having viscosity grades in the range of about 10 cps. to about 400 cps. By viscosity grade is meant the viscosity of a 2% aqueous solution of the cellulose ether measured at 20° C. The low viscosity grades of methyl cellulose and hydroxypropyl methyl cellulose are preferred cellulose ethers, since they are very easily dissolved in water. This makes for improved efficiency in commercial operations.

The monomers employed in the inversion polymerization process are the essentially water-insoluble, ethylenically unsaturated liquid monomers which form polymers which are insoluble in their monomers. Examples of such monomers are the vinyl halides; such as vinyl chloride, vinyl bromide, etc., the vinylidene halides; such as vinylidene chloride, etc., the vinyl alkanoates; such as vinyl acetate, etc.; acrylonitrile, and mixtures of said monomers. Other ethylenically unsaturated monomers may be used in admixture with the above monomers so long as such admixtures remain essentially insoluble in water and form polymers which are insoluble in their monomers. The most useful monomer in the present inversion polymerization process is vinyl chloride and the invention will be described hereinafter in connection therewith, it being understood that this is merely for simplicity of description and is not intended in a limitative sense.

As previously pointed out, in the polymerization of the monomer or monomers, in accordance with the present invention, a monomer-soluble free radical producing catalyst or initiator is employed. As examples of such catalysts there may be named di-secondary butyl peroxydicarbonate, isopropyl peroxypercarbonate, lauroyl peroxide, and the like. However, any of the monomer-soluble catalysts suitable for olefinic polymerizations may be used by those skilled in the art. The first stage of the polymerization reaction is conducted, at a temperature in the range of about 25° C., to about 80° C. When the water-in-monomer phase is employed in the first stage, the mixture is heated with agitation, to a temperature of between about 25° C. and about 85° C. and preferably between about 45° C. and about 60° C. for a period of time sufficient to provide the desired conversion of monomer to polymer. When the desired conversion in the first stage has been obtained, additional water, containing the water-soluble suspending agent, is added to the reaction with sufficient vigorous agitation to form an aqueous dispersion wherein water constitutes the continuous phase. Thereafter, the aqueous dispersion is subjected to the usual polymerizing conditions of time and temperature so that the remaining liquid monomer is essentially completely converted to solid polymer. As pointed out above, usually a temperature in the range of about 30° C. to about 80° C. is sufficient with a reaction time in the range of about 2 hours to about 10 hours being required to attain the desired conversion and molecular weight.

In the practice of the present invention, the inversion polymerization process is conducted in a reactor, the internal surfaces of which have been previously coated with a water-insoluble prime coating and with a water-soluble top coating applied to said prime coating. The prime coating used in the present invention is a film or coating of a condensed polyhydric phenol or naphthol or the condensation product of two or more polyhydric phenols which is applied to the interior surfaces of the polymerization reaction vessel by merely contacting said surfaces with an aqueous alkali metal hydroxide solution of said condensed polyhydric phenol or naphthol. The coating solution is sprayed or brushed on the internal surfaces of the reactor and the coating is then rinsed with water. Drying of the coating is not necessary prior to the application of the top coating.

The self-condensed and co-condensed polyhydric phenols or naphthol useful in the prime coating of the instant invention are described in U.S. Pat. No. 4,080,173, issued Mar. 21, 1978, as well as the means of making the same. Suffice it to say that the prime coating materials, useful herein, are made by heating any one or more of resorcinol, hydroquinone, catechol or phloroglucinol either with or without a suitable catalyst. The same is true for the self-condensed polyhydric naphthols, such as, for example, 2,7-dihydroxy naphthalene, 3,7-dihydroxy naphthalene, 2,6-dihydroxy naphthalene, and the like. The polyhydric phenol or naphthol is heated under an inert atmosphere, such as nitrogen, argon, and the like, at a temperature in the range of about 210° C. for a period of time ranging from about 10 minutes to about 500 minutes or 8 hours. Various catalysts may be employed in the reaction, such as zinc chloride, aluminum chloride, sodium hydroxide, and the like. Sodium hydroxide is the most preferred catalyst. A catalyst concentration of from about 0.05 mole to about 0.50 mole per mole of the compound or compounds being condensed is satisfactory. It is understood, of course, that the particular time and temperature selected is dependent upon the catalyst employed and the final molecular weight of the condensation product desired.

The top coating, which is an aqueous solution of a water-soluble suspending agent, is applied over the prime coating by spraying, preferably, and draining the excess solution from the reactor. It is not necessary to dry the top coating and the reactor can be charged immediately with the reaction mixture to be employed in the first stage of the inversion polymerization reaction. However, the top coating can be dried, if one desires, such as by blowing a heated gas through the reactor, etc. Whether or not the top coating is dried, care must be taken to not prematurely remove the top coating by getting water under pressure directly in contact with the coated surfaces, such as by means of a pressure hose, and the like. As examples of water-soluble suspending agents, useful as a top coating in the present invention, there may be named methyl cellulose, hydroxypropyl methyl cellulose, polyvinyl alcohol, polyethylene oxide, polyvinyl pyrrolidone, and the like.

In the top coating the suspending agent is employed in a concentration in the range of about 0.5% to about 5.0% by weight is used. The concentration will depend in great part upon the molecular weight of the suspending agent being employed. For example, 3.0% to 4.0% by weight solution of hydroxypropyl methyl cellulose in water is very satisfactory.

In the first stage of the inversion polymerization process when the monomer(s) constitutes the continuous phase, the top coating is insoluble in said phase and substantially prevents the buildup of polymer on the internal surfaces of the reactor. In the second stage of the reaction when the water constitutes the continuous phase, the top coating is dissolved off the surfaces into the reaction medium leaving the prime coating intact. If any polymer buildup has occurred during the first stage, it is removed into the reaction medium when the top coating is dissolved. Surprisingly, it has been found that what little polymer buildup that has occurred on the top coating during the first stage does not affect the finished polymer quality even though removed into the reaction medium. Any large "sandy" buildup polymer particles would, in any event, be separated when the polymer is screened after passing through the dryer.

The prime coating and top coating solutions of the present invention are made by conventional methods, using heat and agitation where necessary. When using a self- or co-condensed polyhydric phenol or polyhydric naphthol in the prime coating it is dissolved in the aqueous alkali metal hydroxide solution to an extent such that the solids content of the coating solution does not prevent it being sprayed on the inner surfaces of the reactor through appropriate spray nozzles. Usually a coating solution having a solids content of coating material in the range of about 0.1% to about 20.0% by weight is satisfactory. However, since the solids content depends upon the molecular weight of the particular material being used, it could, in certain instances, be greater than 20.0% or less than 0.1% by weight.

In order to further illustrate the present invention, the following specific examples are given. It is to be understood, however, that this is merely intended in an illustrative and not in a limitative sense. In the examples, all parts and percents are by weight, unless otherwise indicated.

EXAMPLE I

In this Example the inner surfaces of a polymerization reactor were coated with a prime coating of a self-condensed polyhydric phenol which was self-condensed resorcinol. The self-condensed resorcinol was made by heating resorcinol in a reaction vessel under a nitrogen atmosphere using 25 molar % NaOH as a catalyst. The heating was continued at 273° C. until a self-condensed resorcinol having a softening point of 102° C. was obtained. Thereafter the product was dissolved in 1% NaOH to give a coating solution containing 1% of selfcondensed resorcinol. The internal surfaces of the polymerization reactor were then coated with said solution by spraying and thereafter rinsed with demineralized water. Then the coated surfaces were topcoated with a 3% aqueous solution of hydroxypropyl methyl cellulose and allowed to drain. The excess coating solution was removed from the reactor. Then 0.68 part of sorbitan monostearate, based on 100 parts of monomer, was charged to the reactor. The reactor was then evacuated to 27 inches of mercury. Then 0.02 part per hundred monomer of a 20% solution of di-secondary butyl peroxydicarbonate in hexane was charged to the reactor followed by 100 parts of vinyl chloride. The reactor was heated to 52° C. at about 120 psig pressure. Then 40 parts of demineralized water containing 0.04 part of hydroxypropyl methyl cellulose was added over a period of 15 minutes with agitation in a manner to avoid direct contact with the wall. The first stage polymerization was continued with agitation for a period of one hour or to a conversion of monomer to polymer of about 8%.

After the first stage, 160 parts of demineralized water containing 0.16 part of hydroxypropyl methyl cellulose was metered into the reactor over a period of one hour. Thereafter, the polymerization reaction was continued in the second stage with water being the continuous phase until the pressure in the reactor reached 90 psig. This resulted in a total conversion of monomer to polymer of about 85%. The polymer was removed and dried in the usual manner. Thereafter, the inner surfaces of the reactor were examined and found to be substantially free of polymer buildup. The polymer or polyvinyl chloride (PVC) so produced had a large and uniform particle size and had high porosity, as evidenced by the ability of the PVC particles to readily absorb plasticizer.

EXAMPLE II

In this Example the inner surfaces of a polymerization reactor were coated with a prime coating of a self-condensed polyhydric phenol which was self-condensed resorcinol, but of a higher molecular weight than that used in Example I. The self-condensed resorcinol was made by heating resorcinol in a reaction vessel under a nitrogen atmosphere using 25 molar % NaOH as a catalyst. The heating was continued at 280° C. until a high molecular weight self-condensed resorcinol having a softening point of 113° C. was obtained. Thereafter, the product so produced was dissolved in 1% NaOH to give a coating solution containing 1% of self-condensed resorcinol. Then, using the procedure of Example I, the polymerization reactor was coated with the prime and top coatings. Thereafter, vinyl chloride was polymerized in the coated reactor employing the same procedure as outlined in Example I. Upon completion of the reaction and recovery of the PVC polymer, it was noted that the reactor surfaces were substantially free of polymer buildup and the PVC so produced had a uniform particle size and had high porosity, again evidenced by the ability of the PVC particles to readily absorb plasticizer.

Coating of the internal surfaces of the polymerization reactor with a prime coating and a top coating thereon, in accordance with the present invention, for use with the inversion polymerization process, substantially reduces polymer buildup on said surfaces. This results in increased production over a unit period of time. The polymer buildup, if any, that may occur in the first stage or the monomer continuous phase stage, is removed into the reaction medium by dissolution of the top coating during the second stage or water continuous phase stage. In those instances where a little polymer buildup does accumulate on the interior surfaces during the second stage, it is not of the hard, rough, difficult-to-remove type and is easily removed without employing the difficult and tedious scraping methods that have heretofore been ncessary in the art. Further, the polymer particles produced in accordance with the present invention are of a highly uniform size, shape and porosity. These polymers have improved bulk density, low gel content and good flow characteristics. The polymer particles are capable of enhanced, uniform, plasticizer absorption. Numerous other advantages of the present invention will be apparent to those skilled in the art.

While the present invention has been described in terms of its specific embodiments, certain modifications and equivalents will be apparent to those skilled in the art and are intended to be included within the scope of the invention, which is to be limited only by the scope of the appended claims.

I claim:

1. In a process of inversion polymerizing substantially water-insoluble polymerizable ethylenically unsaturated monomer(s) in a reaction vessel by first forming a continuous monomer(s) phase in the presence of a monomer-soluble surface active agent and a monomer-soluble catalyst, polymerizing said monomer phase at a temperature in the range of about 25° C. to about 85° C. until a conversion to polymer less than about 20% occurs, adding sufficient water to the monomerpolymer mixture with agitation and in the presence of at least about 0.1% by weight of a water-soluble suspending agent for said monomer(s) to form a dispersion wherein water is the continuous phase, then polymerizing the dispersion at a temperature in the range of about 30° C. to about 80° C. to convert the remaining monomer(s) to polymer, the improvement which comprises (1) applying a prime coating to the internal surfaces of said reaction vessel, said prime coating comprising a condensation product selected from the group consisting of (a) the self-condensation product of a polyhydric phenol, (b) the condensation product of two or more polyhydric phenols, and (c) the self-condensation product of a polyhydric naphthol, (2) applying to said prime coating a top coating of a water-soluble suspending agent, (3) polymerizing the continuous monomer(s) phase in constant contact with said top coating, and (4) polymerizing said continuous water phase in constant contact with said prime coating after dissolving said top coating in the continuous water phase, whereby polymer buildup on said internal surfaces is substantially eliminated.

2. A process as defined in claim 1 wherein the monomer is vinyl chloride.

3. A process as defined in claim 1 wherein the prime coating is self-condensed resorcinol.

4. A process as defined in claim 1 wherein the top coating is an alkyl hydroxyalkyl cellulose ether.

5. A process as defined in claim 1 wherein the continuous monomer phase is a water-in-monomer dispersion.

6. A process as defined in claim 1 wherein the monomer-soluble surface active agent is selected from the group consisting of nonionic esters of fatty acids with glycerol, sorbitol and their polyoxyethylene derivatives and nonionic multi-valent salts of fatty acids, alkyl sulfonates and sulfates.

7. A process as defined in claim 1 wherein the prime coating is applied to said surfaces from an aqueous alkali metal hydroxide solution thereof.

8. A process as defined in claim 1 wherein the top coating is applied to said prime coating from an aqueous solution thereof.

9. A process as defined in claim 1 wherein the condensation product is the self-condensation product of a polyhydric phenol.

10. A process as defined in claim 1 wherein the condensation product is the condensation product of two or more polyhydric phenols.

11. A process as defined in claim 1 wherein the condensation product is the co-condensation product of resorcinol and hydroquinone.

12. A process as defined in claim 5 wherein the monomer is vinyl chloride.

13. A process as defined in claim 12 wherein the prime coating is self-condensed resorcinol.

14. A process as defined in claim 13 wherein the top coating is hydroxypropyl methyl cellulose.

15. A process as defined in claim 14 wherein said self-condensed resorcinol is dissolved in an aqueous alkali metal hydroxide solution to give a solids content in the range of about 0.1% to about 20.0% by weight prior to application to the internal surfaces of said reaction vessel.

16. A process as defined in claim 15 wherein said hydroxypropyl methyl cellulose is dissolved in water to give a concentration thereof in the range of about 0.05% to about 10.0% by weight prior to application to the prime coating.

17. A process as defined in claim 16 wherein the monomer-soluble surface active agent is sorbitan monostearate.

* * * * *